US011500816B2

(12) United States Patent
Zhang

(10) Patent No.: US 11,500,816 B2
(45) Date of Patent: Nov. 15, 2022

(54) INTELLIGENT FILE RECOMMENDATION ENGINE

(71) Applicant: Citrix Systems, Inc., Fort Lauderdale, FL (US)

(72) Inventor: Wenshuang Zhang, Nanjing (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 379 days.

(21) Appl. No.: 16/515,432

(22) Filed: Jul. 18, 2019

(65) Prior Publication Data

US 2020/0293491 A1 Sep. 17, 2020

Related U.S. Application Data

(63) Continuation of application No. PCT/CN2019/077743, filed on Mar. 12, 2019.

(51) Int. Cl.
*G06F 17/00* (2019.01)
*G06F 16/14* (2019.01)
*G06N 20/00* (2019.01)
*G06F 16/176* (2019.01)

(52) U.S. Cl.
CPC .......... *G06F 16/156* (2019.01); *G06F 16/176* (2019.01); *G06N 20/00* (2019.01)

(58) Field of Classification Search
CPC ...... G06F 16/156; G06F 16/176; G06N 20/00
See application file for complete search history.

(56) References Cited

U.S. PATENT DOCUMENTS

| 9,129,227 | B1* | 9/2015 | Yee | G06N 20/00 |
| 2015/0052141 | A1* | 2/2015 | Charng | G06F 16/335 |
| | | | | 707/737 |
| 2016/0286277 | A1* | 9/2016 | Yin | H04N 21/25891 |
| 2017/0075908 | A1* | 3/2017 | Mitra | G06F 16/78 |
| 2018/0150785 | A1* | 5/2018 | Wang | G06N 20/00 |
| 2018/0357548 | A1* | 12/2018 | Nichols | G06N 5/04 |

(Continued)

FOREIGN PATENT DOCUMENTS

| CN | 103186527 A | 7/2013 |
| CN | 104391843 A | 3/2015 |

(Continued)

OTHER PUBLICATIONS

Michael Muller et al., Patterns of usage in an enterprise file-sharing service: publicizing, discovering, and telling the news. Proceedings of the SIGCHI Conference on Human Factors in Computing Systems. Association for Computing Machinery, New York, NY, pp. 763-766, Apr. 2010.*

(Continued)

*Primary Examiner* — Greta L Robinson
(74) *Attorney, Agent, or Firm* — Banner & Witcoff, Ltd.

(57) ABSTRACT

Methods and systems for recommending files to users are described herein. Files may be recommended to a user within a file sharing service. A recommender system may intelligently recommend files to users according to their preferences through machine learning. In addition, a recommender system may recommend files based on what is popular within a group to which the user belongs. The recommendations may be adjusted based on user interaction with one or more recommended files.

18 Claims, 6 Drawing Sheets

(56) References Cited

U.S. PATENT DOCUMENTS

2020/0293491 A1     9/2020     Zhang

FOREIGN PATENT DOCUMENTS

| | | |
|---|---|---|
| CN | 105243066 A | 1/2016 |
| JP | 2015162170 A | 9/2015 |

OTHER PUBLICATIONS

Michael Muller et al., We are all lurkers: consuming behaviors among authors and readers in an enterprise file-sharing service. In Proceedings of the 16th ACM international conference on Supporting group work, Association for Computing, pp. 201-210, Nov. 2010.*

Elisa Quintarelli, Emanuele Rabosio, and Letizia Tanca. Recommending New Items to Ephemeral Groups Using Contextual User Influence. In Proceedings of the 10th ACM Conference on Recommender Systems (ReeSys '16). Association for Computing Machinery, 285-292, Sep. 2016.*

Dec. 18, 2019—(WO) International Search Report and Written Opinion—App PCT/CN2019/077743.

Yeung, Albert Au, "Matrix Factorization: A Simple Tutorial and Implementation in Python", downloaded Feb. 22, 2019 from http://www.quuxlabs.com/blog/2010/09/matrix-factorization-a-simple-tutorial-and-implementation-in-python/, posted Sep. 16, 2010, 7 pages.

"Recommender System", Wikipedia, downloaded Feb. 8, 2019 from https://en.wikipedia.org/wiki/Recommender_system, 16 pages.

Aldrich, Susan E., "Recommender Systems in Commercial Use", AI Magazine, (Fall 2011), pp. 28-34.

Burke, Robin et al., "Recommender Systems: An Overview", AI Magazine (Fall 2011), pp. 13-18.

Aug. 2, 20223—(AU) First Examination Report—App 2019433967.

* cited by examiner

INTELLIGENT FILE RECOMMENDATION ENGINE

CROSS REFERENCE TO RELATED APPLICATIONS

This application claims priority to International Application No. PCT/CN2019/077743, filed Mar. 12, 2019, and entitled "Intelligent File Recommendation Engine," which is hereby incorporated by reference in its entirety.

FIELD

Aspects described herein generally relate to artificial intelligence, software, and cloud computing environments. More specifically, aspects described herein relate to artificial intelligence for making file recommendations to users within a file sharing environment.

BACKGROUND

File sharing services may enable users to easily and securely exchange files. However, there may be a large number of shared files in a file sharing service, making it difficult for users to find and view files that interest them. In addition, users may be part of groups within the file sharing service. There may be many files shared by group members within the file sharing service and it may be difficult to determine which group files a user should view or which group files are of interest to the user.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed towards an artificial intelligence engine trained and usable to recommend files to a user within a file sharing service. A recommender system may intelligently recommend files to users according to their preferences through machine learning and/or AI. Users may have an improved user experience because they can more quickly find and interact with files they may be interested in within a file sharing service that may contain a large number of files.

In one aspect, a computer implemented method may include determining user behavior data corresponding to a user within a file sharing service, wherein the user is part of a group of users; generating one or more feature vectors based on the user behavior data, and based on group behavior data corresponding to actions taken by users of the group within the file sharing service; generating, by a first recommender model and based on the one or more feature vectors, a first set of recommended files for the user; and displaying the first set of recommended files to the user.

The method may further include determining that user interaction with the first set of recommended files fails to satisfy a threshold; generating a modified first recommender model by modifying training parameters of the first recommender model; and generating a second set of recommended files for the user using the modified first recommender model. Determining whether user interaction with the first set of recommended files fails to satisfy a threshold may include determining an amount of time the user spends viewing one or more files of the first set of recommended files.

The method may further include determining that user interaction with the first set of recommended files fails to satisfy a threshold; and displaying a second set of recommended files for the user, wherein the second set is generated using a second recommender model. Determining whether user interaction with the first set of recommended files fails to satisfy a threshold may include determining whether one or more files of the first set of recommended files was edited by the user. The user behavior data may include information corresponding to files viewed by the user. The user behavior data may include information corresponding to files modified by the user. The group behavior data may include information indicating files shared within the file sharing service by one or more users of the group. The group behavior data may include information indicating files viewed within the file sharing service by one or more users of the group.

In other aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
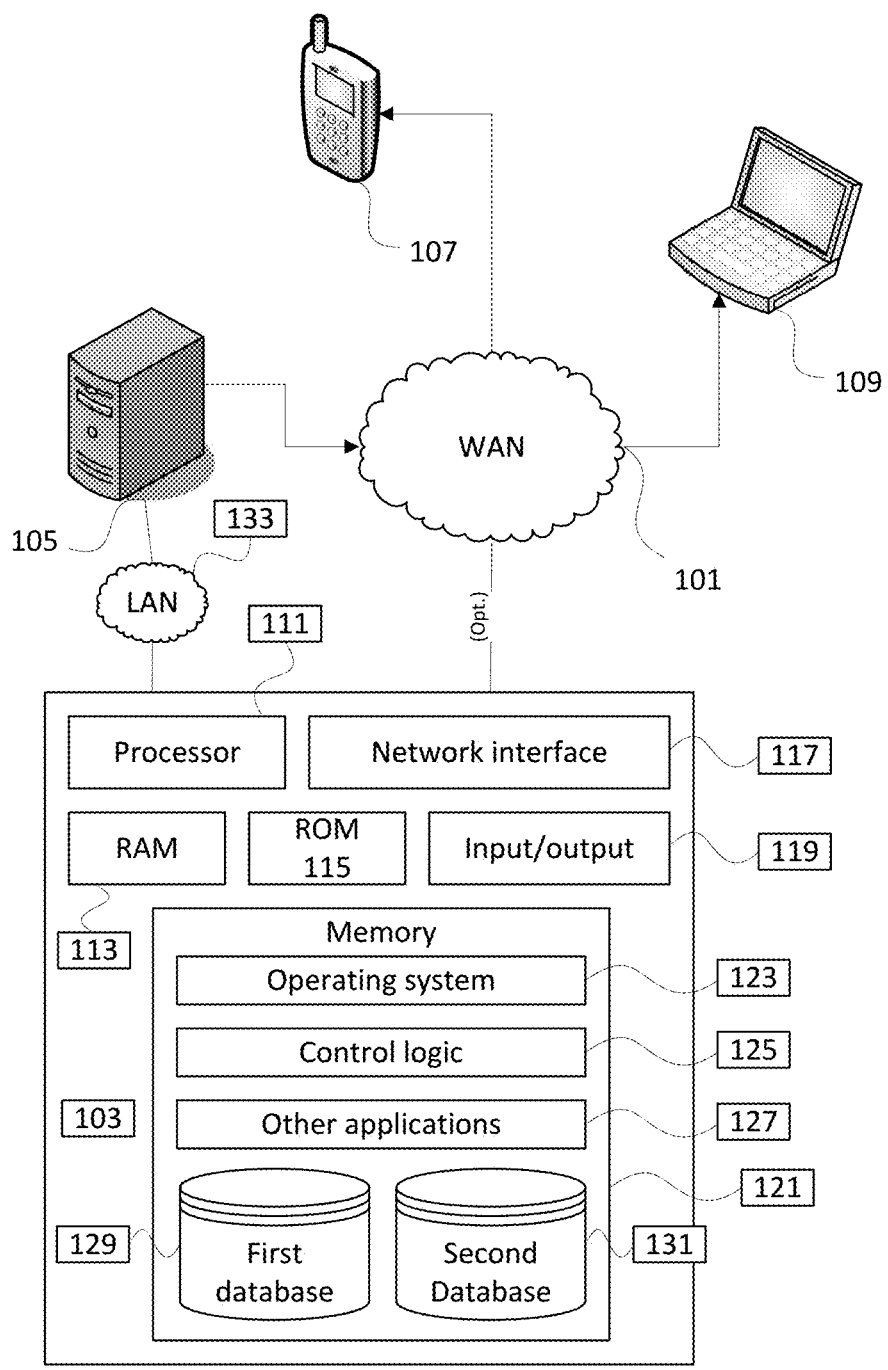
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
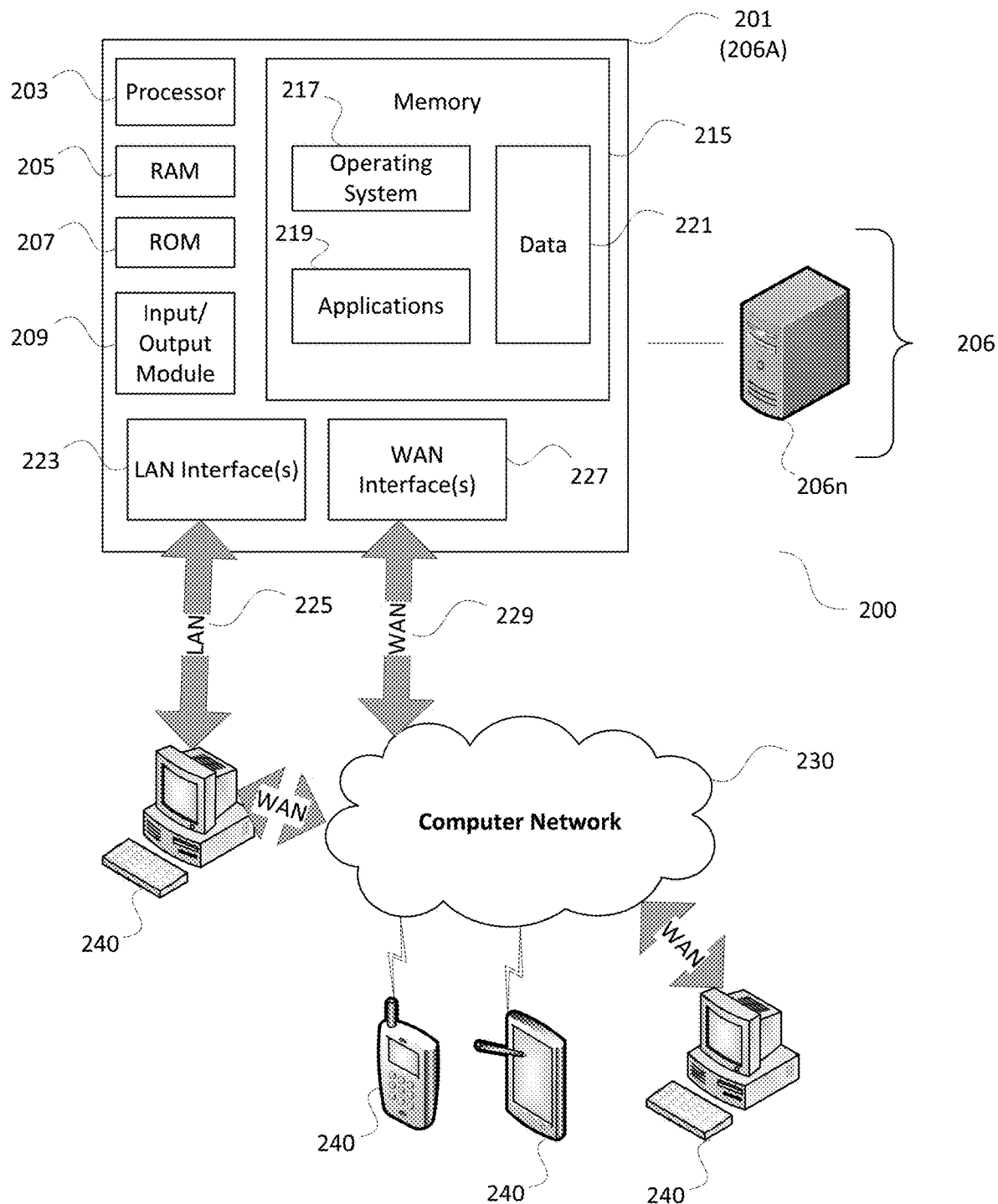
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
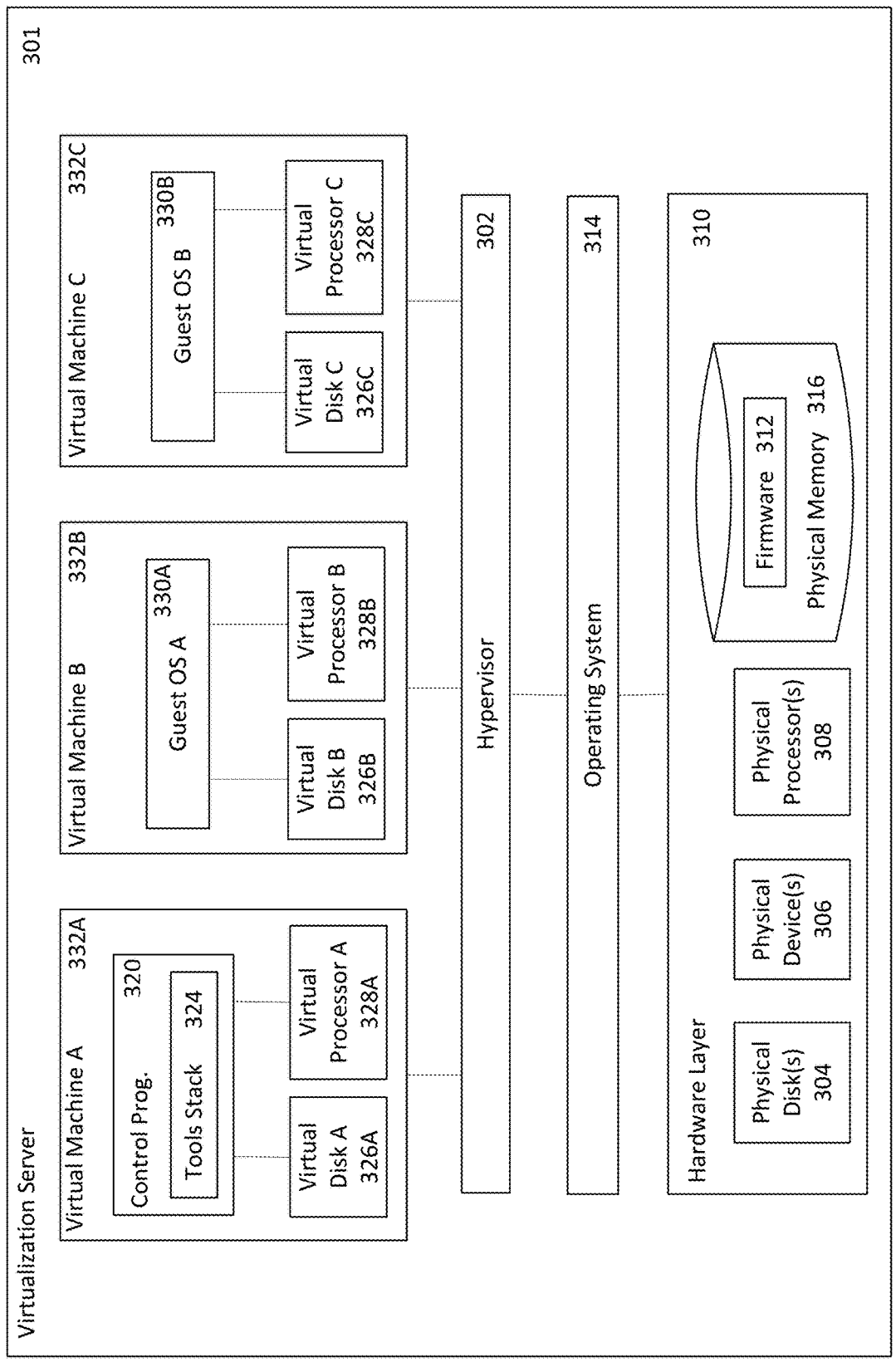
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
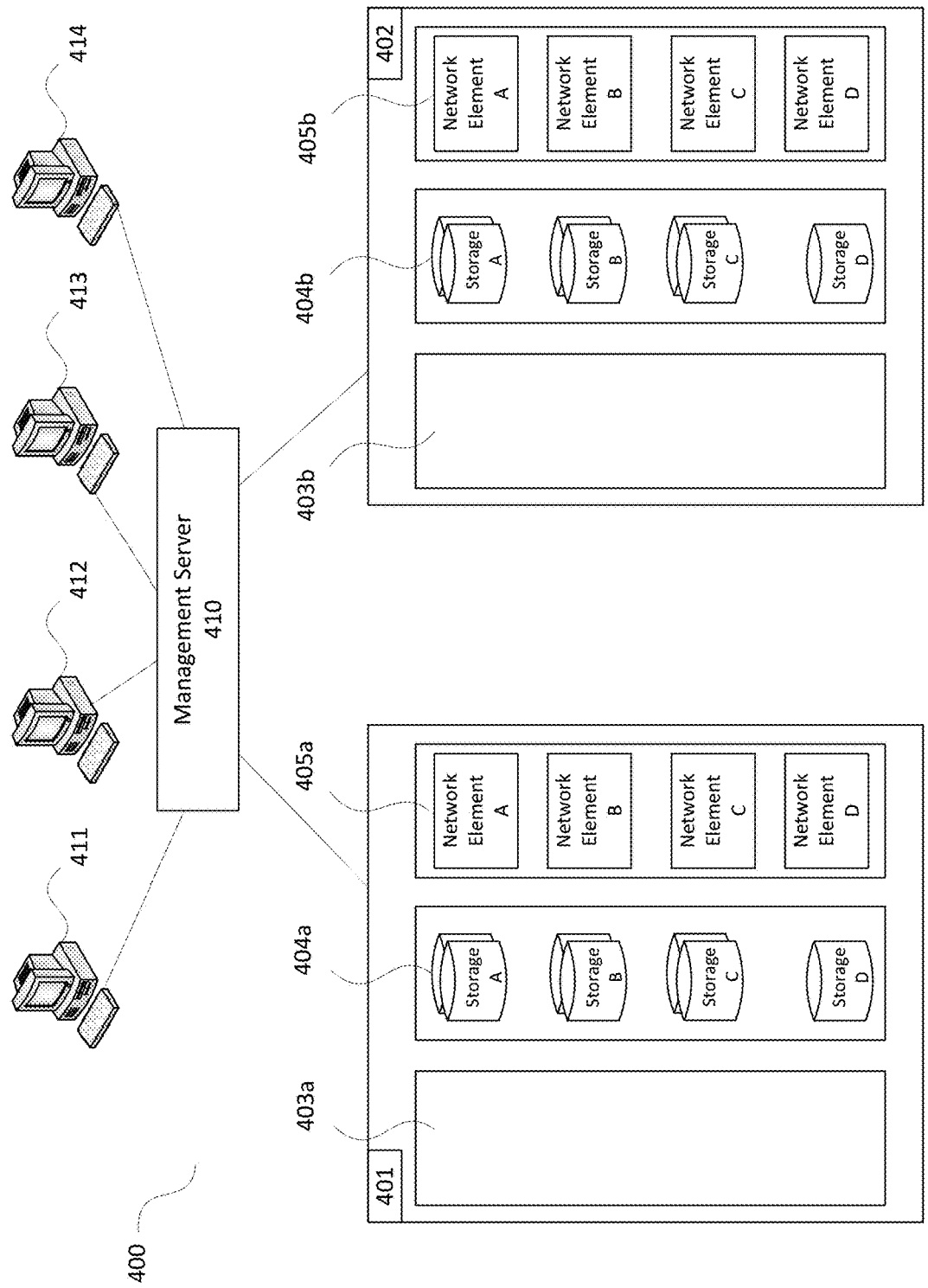
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Intelligent File Recommendation Engine

Figure 5:
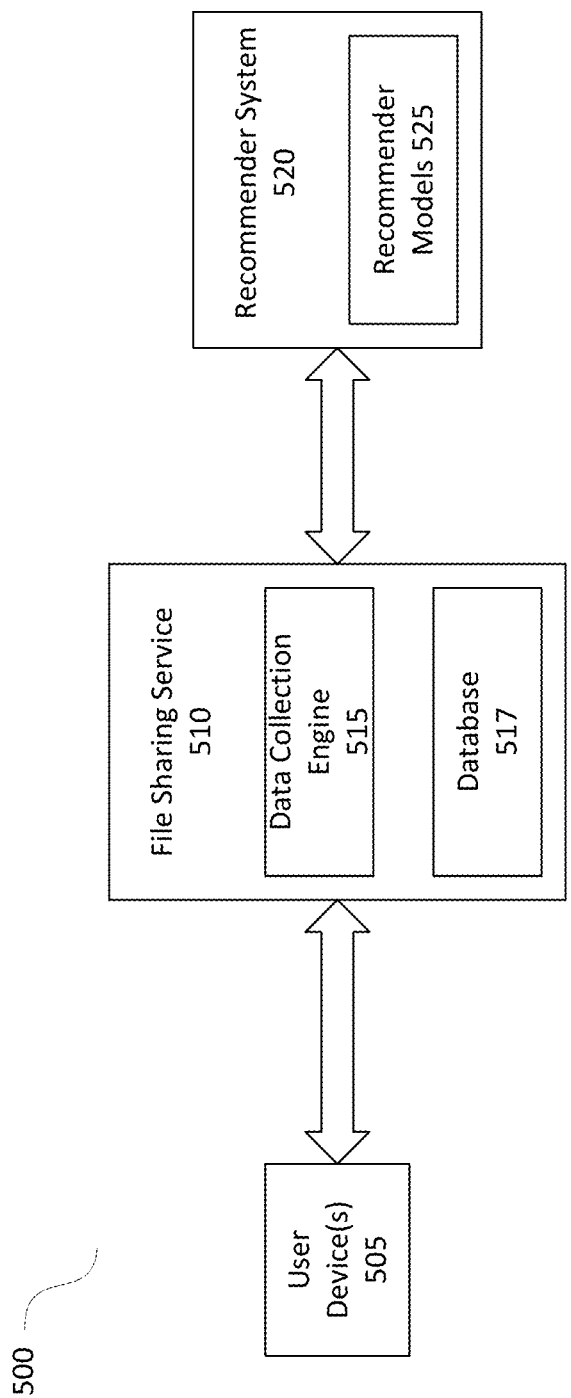
FIG. 5 depicts an illustrative file recommender system that may be used in accordance with one or more illustrative aspects described herein.

FIG. 5 depicts an illustrative AI file recommender system 500 that may be used in accordance with one or more illustrative aspects described herein. The file recommender system 500 may include one or more computer systems that communicate via one or more networks. For example, the file recommender system 500 may include the user device(s) 505, the file sharing service 510, the data collection engine 515, the recommender system 520, and the recommender models 525. Any component within the file recommender system 500 may include one or more components described in FIGS. 1-4.

The user device 505 may be a smartphone, personal digital assistant, laptop computer, tablet computer, desktop computer, smart home device, or any other device configured to perform one or more functions described herein. For instance, the user device 505 may be configured to communicate with the file sharing service 510 to receive file recommendations for a user that is associated with user device 505. A recommended file may be any type of file (e.g., video, text, picture, PDF, other proprietary file type, etc.). Although the file recommender system 500 as shown includes a single user device 505, it should be understood that the file recommender system 500 may include any number of user devices similar to the user device 505.

In addition, the user device 505 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by the user device 505 may be associated with an external portal, web page, or application provided by an organization. The web pages, information, and/or other graphical user interfaces may allow a user to interact with the file sharing service 510, and/or with file recommendations generated by the recommender system 520.

The file sharing service 510 may be used by one or more users to share files with other users. The file sharing service 510 may include one or more servers. The file sharing service 510 may include a cloud computing environment such as cloud computing environment 400. The file sharing service 510 may store files that are uploaded by users. Any type of file (e.g., video, text, picture, PDF, other proprietary file type, etc.) may be uploaded and/or shared using the file sharing service 510. The file sharing service 510 and the recommender system 520 may both be implemented on the same device or separate devices. Additionally/alternatively, they may both be part of the same cloud computing environment.

A user may be required to login to the file sharing service 510 to use the service. The file sharing service 510 may create an account for each user of the service. Each user of the file sharing service 510 may be part of a group of users. For example, a user may be placed in a group with other users that are in the same department at work. Groups may be nested within other groups. For example, a user may belong to a group that represents a department and a subgroup that represents a team within the department.

The file sharing service 510 may include the data collection engine 515. In some examples, the recommender system 520 may include the data collection engine 515. The data collection engine 515 may be configured to collect data corresponding to one or more user's interactions with the file sharing system 510 as described below in steps 603-606 of FIG. 6. The file sharing service 510 may contain the database 517. The file sharing service 510 may store user behavior data in the database 517.

As illustrated in greater detail below, the recommender system 520 may include one or more components configured to perform one or more of the functions described herein. For example, the recommender system 520 may include the recommender models 525. The recommender models 525 may include one or more models that can be used to recommend files contained in the file sharing service 510 to users. Each model within the recommender models 525 may use a different algorithm for making file recommendations. For example, one model within recommender models 525 may use a matrix factorization algorithm to generate recommendations while another model may use a neural network to generate recommendations. One or more models within recommender models 525 may use machine learning to generate file recommendations. The recommender models 525 may be trained by the recommender system 520 using data collected from users of the file sharing service 510.

Figure 6:
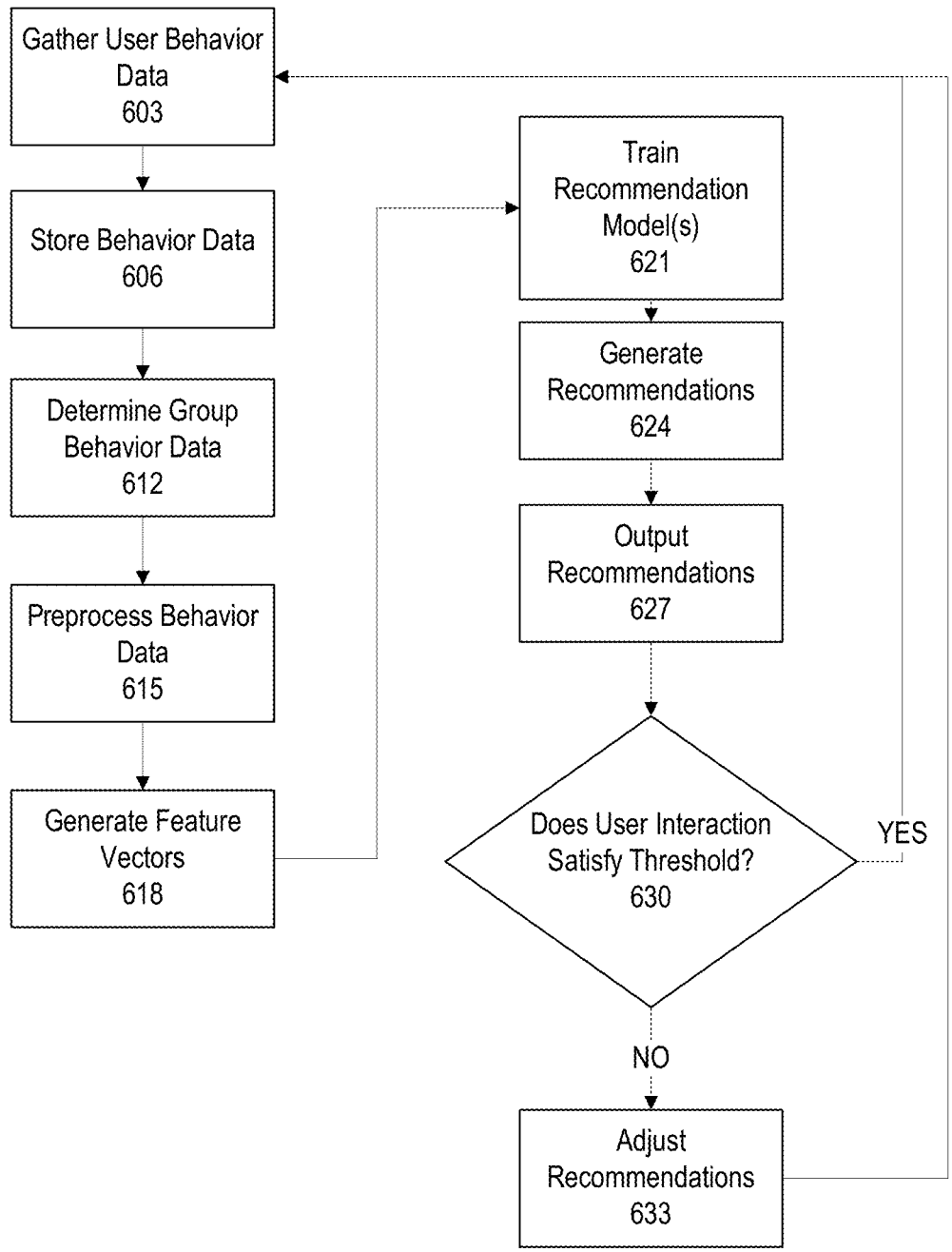
FIG. 6 depicts an illustrative algorithm for recommending one or more files to a user in accordance with one or more illustrative aspects described herein.

FIG. 6 depicts an illustrative algorithm for recommending one or more files to a user within a file sharing service. At step 603, the file sharing service 510 may gather user behavior data. The file sharing service 510 may gather data from all users of the service. The file sharing service 510 may record any action that a user takes within the file sharing service 510. For example, a user may rate a file (e.g., from one star to five stars) and the file sharing service may gather the ratings for the recommender system 520 to use in making recommendations. Additional data that may be collected from users may include: text of searches that a user performs within the file sharing service 510; the files that a user marks to make them more easily accessible (e.g., files that a user adds to a favorites folder or other folder, files that a user adds a bookmark to, etc.); the files that a user views within the file sharing service 510 (this may include the file name, a description of the file, any contents of the file, the author of the file, etc.); the files that a user edits; the date a file is viewed or edited; the amount of time a user spent viewing or editing a file; whether a user sent a file to another user within the file sharing service 510; whether a user sent the file to other users within the user's group; whether a file was signed by a member of the user's group or any other user; whether another user within the user's group was given permission to edit a file.

User data may be gathered continuously as users interact with files in the file sharing service 510. Step 603 may be performed one or more times between any step described in FIG. 6.

At step 606, the file sharing service 510 may store the user behavior data in database 517. Any portion of the user behavior data may be used as a feature to recommend files to a user. The user behavior data may be used to determine preferences of a user and to generate file recommendations based on the determined preferences.

At step 612, the file sharing service 510 may determine group behavior data. The file sharing service 510 may store the gathered user data in a way that enables the file sharing service 510 to access the user behavior data of each user within a group and/or subgroup. The group behavior may include any type of user behavior data (e.g., any data described in step 603 above).

At step 615, the behavior data may be preprocessed. For example, the preprocessing may be performed by the file sharing service 510 or the recommender system 520. Preprocessing may include, for example, structuring the data, performing semantic segmentation on the textual data, and feature extraction. Preprocessing may include stemming textual data such as the title, description, or content of files.

At step 618, the recommender system 520 may generate feature vectors. The feature vectors may be generated using the user behavior data resulting from step 615. The feature vectors may include data that may be used in collaborative filtering based algorithms. For example, the feature vectors may include any data described above in step 603.

Additionally/alternatively, the feature vectors may include data that may be used in content-based filtering algorithms. The feature vectors may include data and/or be based on data from the files within the file sharing service 510. For example, the date the file was created and/or modified may be included in a feature vector. Any data corresponding to the file may be used in generating the feature vectors (e.g., the file name, a description of the file, any contents of the file, the author of the file, etc.).

The popularity of each file within file sharing service 510 may be measured and tracked. The popularity of the file may be used as a feature in a feature vector and may be combined with user behavior data to train a recommender model to make file recommendations. For example, the popularity of each file may be measured in the number of interactions the file has had (either the number of interactions within a group or the number of interactions overall). Interactions with the recommended files may include views, edits, shares, downloads, comments, sending a file to other users within the user's group, signing a file, giving permission to another user to edit a file, or any other action a user may perform on a file.

At step 621, the recommender system 520 may train recommendation model(s) to be used in recommending files to users of the file sharing service 510. The recommendation model(s) may be stored with the recommendation models 525. The recommender system 520 may use machine learning to train a model. Any recommendation algorithm may be used to train a model within recommendation models 525, including content-based filtering algorithms and collaborative filtering algorithms. For example, the recommender system 520 may use a decision tree, neural network, Bayesian statistical methods, etc., to train a model and generate recommendations. The recommender system 520 may train the model to recommend files for one or more users. The training may use all or a portion of the user behavior data or any other data described above. For example, the recommender system 520 may use the feature vectors described above in step 618.

The recommender system 520 may generate embeddings or vector representations for portions of the user behavior data and/or the file data described above in step 618. The vector representations may be used in training a model in recommender models 525. For example the recommender system 520 may generate an embedding of each file within the file sharing service 510 by using the title, description, and/or content of the file. The dimensions of the embeddings may be any number (e.g., 1 by 300, 1 by 500, 1 by 2000, etc.). The embeddings may be used in a machine learning or recommender system algorithm including any algorithm described in steps 621-624 below.

When training a model using a collaborative filtering recommendation algorithm, the recommender system 520, may limit the training data to data that comes from users that are within the same group (e.g., department, team, etc.) as the user for which the recommendations are being generated. In one example, the recommender system 520 may use a matrix factorization algorithm to train a model. When using a matrix factorization model, a first user that tends to view the same files as a second user may be recommended files that the second user has viewed. The recommender system 520 may use feature vectors that include the amount of time a user has spent viewing a file to train the matrix factorization model.

For example, the recommender system 520 may generate a user-file matrix with each user as a row and each file as a column. Each value $m_{ij}$ in the user-file matrix may represent an amount of time the user at position i spent viewing the file at position j (however any of the user behavior data described in step 603 may be used). In one example, each value $m_{ij}$ in the user-file matrix may be a 1 if the user represented by row i has viewed the file represented by column j. If the user represented by row i has not viewed the file represented by column j then the value $m_{ij}$ in the user-file matrix may be blank. The recommender system 520 may generate two additional matrices (e.g., a user matrix and a file matrix) that when multiplied together, create an approximation of the user-file matrix. For example, the recommender system 520 may have a number of latent features k. The user matrix may have a row for each user and k columns, each column representing a latent feature. The file matrix may have a row for each file in file sharing service 510 and k columns, each column representing a latent feature.

The recommender system 520 may use gradient descent to determine the values of the user matrix and the file matrix. For example, the recommender system 520 may initialize the user matrix and the file matrix with random values. The recommender system 520 may then calculate an approximation matrix of the user-file matrix by calculating the product of the user matrix and the file matrix. The recommender system 520 may calculate a difference between the approximation matrix and the user-file matrix. The recommender system 520 may adjust the values in the user matrix and/or the file matrix to minimize the difference between the approximation matrix and the user-file matrix. The process of calculating a difference between the approximation matrix and the user-file matrix, and adjusting the values of the user matrix and/or the file matrix may be repeated until convergence. The recommender system 520 may use regularization to avoid overfitting when training with gradient descent.

After training the matrix factorization model is completed, the recommender system 520 may recommend files to users using the final approximation matrix. For example, the recommender system 520 may recommend files for a user if they were blank in the user-file matrix but have a high value in the approximation matrix. The recommender system 520 may sort each file by its corresponding value in the approximation matrix and may suggest a number (e.g., 1, 3, 5, etc.) of the highest valued files.

The recommender system 520 may generate a model in recommender models 525 that recommends files based on the popularity of a file within a group of users. For example, users within a group may share files such as documents or videos with their group members in the file sharing service 510. Some shared files may become popular within the group and may be interacted with (e.g., viewed, edited, signed, downloaded, etc.) many times. If the number of interactions with a file exceeds some popularity threshold, then the file may be recommended to other group members (e.g., group members that have not interacted with the file). The popularity threshold may be based on a number (e.g., 3, 10, 50, etc.) of interactions with a file from the same group.

Additionally/alternatively, the popularity threshold may be based on the percentage of group members that interacted with the file. For example, if some percentage (e.g., 10%, 25%, 50%, 75%, etc.) of group members interacted with a file, then the file may be recommended to other members of the group.

At step 624, the recommender system 520 may generate file recommendations for a user. File recommendations may be based on the popularity of a file and/or on user preferences. User preferences may be determined based on user behavior data. For example, a user that views several files that discuss a topic may be recommended other files that discuss the same topic. The recommendations may be generated using a model within recommender model(s) 525. At step 627, the recommended files may be output to user device 505. The user device 505 may display the recommended files to a user of the user device 505.

At step 630, whether user interaction with the recommended files satisfies a threshold may be determined. The file sharing service 510 and/or the recommender system 520 may collect user behavior data corresponding to the user's interactions with the recommended files. Interactions with the recommended files may include views, edits, shares, downloads, comments, sending a file to other users within the user's group, signing a file, giving permission to another user to edit a file, etc. The threshold may be based on the number of interactions made with the recommended files within a threshold period of time (e.g., hours, days, weeks, months, years, etc.). For example, if the user viewed a number of recommended files (e.g., 1, 3, 5, 10, etc.) within one day then the recommender system 520 may determine that user interaction with the recommended files is satisfied. The threshold may be based on any combination of different types of interactions including views, edits, shares, downloads, comments, or any other type of interaction with a file. For example if the user viewed at least 2 recommended files and edited at least 1 recommended file then the recommender system 520 may determine that user interaction with the recommended files is satisfied. If it is determined that user interaction with the recommended files does not satisfy the threshold then step 633 may be performed. If it is determined that user interaction with the recommended files does satisfy the threshold then step 603 may be repeated.

At step 633, the recommender system 520 may adjust the recommendations. The recommender system 520 may adjust the recommendations by adjusting parameters used in a model within recommendation models 525. For example, in a matrix factorization model (e.g., as described above), the number of latent features may be increased or decreased. In a neural network model, hidden layers may be added or removed. Additionally/alternatively the recommender system 520 may adjust the recommendations by retraining the model used to generate the recommendations with additional user behavior data that has been collected by the file sharing service 510.

The recommender system 520 may adjust the recommendations by giving more weight to one or more features over other features. For example, the files shared by a user may be given more weight than the files viewed by a user when training a model within recommendation models 525 and generating recommendations. Additionally/alternatively, the recommender system 520 may stop using one or more features when training or generating file recommendations. For example, the recommender system 520 may stop using the files downloaded by a user as a feature in training and generating recommendations.

The recommender system 520 may adjust the recommendations by using a different model. For example, if the recommendations generated in step 624 were generated using a matrix factorization model then the recommender system 520 may switch to a neural network model to generate different recommendations. The recommender system 520 may switch to any model within recommender models 525. The recommender system 520 may combine models within recommendation models 525 to create an ensemble. For example, a decision tree model could be combined with a neural network model. After adjusting recommendations, any of steps 603-633 may be repeated.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computer-implemented method, comprising:
   determining, by a computing device comprising a processor, user behavior data corresponding to a user within a file sharing service, wherein the user is part of a group of users;
   generating, by the computing device, one or more feature vectors based on the user behavior data, and based on group behavior data corresponding to actions taken by the group of users within the file sharing service;
   generating, by the computing device, using a first recommender model and based on the one or more feature vectors, a first set of recommended files for the user;
   causing, by the computing device, to display the first set of recommended files to the user;
   determining that user interaction with the first set of recommended files fails to satisfy a threshold; and
   causing to display a second set of recommended files for the user, wherein the second set is generated using a second recommender model.

2. The computer-implemented method of claim 1, further comprising:
   after determining that the user interaction with the first set of recommended files fails to satisfy the threshold,
   generating a modified first recommender model by modifying training parameters of the first recommender model; and
   generating the second set of recommended files for the user using the modified first recommender model.

3. The computer-implemented method of claim 1, wherein determining that the user interaction with the first set of recommended files fails to satisfy the threshold comprises determining an amount of time the user spends viewing one or more files of the first set of recommended files.

4. The computer-implemented method of claim 1, wherein determining that the user interaction with the first set of recommended files fails to satisfy the threshold comprises determining whether one or more files of the first set of recommended files was edited by the user.

5. The computer-implemented method of claim 1, wherein the user behavior data comprises information corresponding to files viewed by the user.

6. The computer-implemented method of claim 1, wherein the user behavior data comprises information corresponding to files modified by the user.

7. The computer-implemented method of claim 1, wherein the group behavior data comprises information indicating files shared within the file sharing service by one or more users of the group of users.

8. The computer-implemented method of claim 1, wherein the group behavior data comprises information indicating files viewed within the file sharing service by one or more users of the group of users.

9. A system comprising:
a server and a user device,
wherein the server comprises:
one or more processors and memory, configured to:
determine user behavior data corresponding to a user within a file sharing service, wherein the user is part of a group of users;
generate one or more feature vectors based on the user behavior data, and based on group behavior data corresponding to actions taken by the group of users within the file sharing service;
generate, by a first recommender model and based on the one or more feature vectors, a first set of recommended files for the user;
cause to display the first set of recommended files to the user device;
determine that user interaction with the first set of recommended files fails to satisfy a threshold; and
cause to display a second set of recommended files for the user, wherein the second set is generated using a second recommender model.

10. The system of claim 9, wherein the one or more processors and memory are further configured to:
after determining that the user interaction with the first set of recommended files fails to satisfy the threshold,
generate a modified first recommender model by modifying training parameters of the first recommender model; and
generate the second set of recommended files for the user using the modified first recommender model.

11. The system of claim 9, wherein determining that the user interaction with the first set of recommended files fails to satisfy the threshold comprises determining an amount of time the user spends viewing one or more files of the first set of recommended files.

12. The system of claim 9, wherein determining that the user interaction with the first set of recommended files fails to satisfy the threshold comprises determining whether one or more files of the first set of recommended files was edited by the user.

13. The system of claim 9, wherein the user behavior data comprises information corresponding to files viewed by the user.

14. The system of claim 9, wherein the user behavior data comprises information corresponding to files modified by the user.

15. A non-transitory machine-readable medium storing instructions, that when executed by one or more processors, cause the one or more processors to:
determine user behavior data corresponding to a user within a file sharing service, wherein the user is part of a group of users;
generate one or more feature vectors based on the user behavior data, and based on group behavior data corresponding to actions taken by the group of users within the file sharing service;
generate, by a first recommender model and based on the one or more feature vectors, a first set of recommended files for the user;
cause to display the first set of recommended files to a user device associated with the user;
determine that user interaction with the first set of recommended files fails to satisfy a threshold; and
cause to display a second set of recommended files for the user, wherein the second set is generated using a second recommender model.

16. The non-transitory machine-readable medium of claim 15, wherein the group behavior data comprises information indicating files shared within the file sharing service by one or more users of the group of users.

17. The non-transitory machine-readable medium of claim 15, wherein the user behavior data comprises information corresponding to files modified by the user.

18. The non-transitory machine-readable medium of claim 15, wherein the group behavior data comprises information indicating files viewed within the file sharing service by one or more users of the group of users.

* * * * *